(12) United States Patent
Yamaguchi

(10) Patent No.: US 7,829,789 B2
(45) Date of Patent: Nov. 9, 2010

(54) POWER FEEDING APPARATUS AND HARNESS WIRING STRUCTURE USING THE SAME

(75) Inventor: Atsuyoshi Yamaguchi, Kosai (JP)

(73) Assignee: Yazaki Corporation, Tokyo (JP)

( * ) Notice: Subject to any disclaimer, the term of this patent is extended or adjusted under 35 U.S.C. 154(b) by 306 days.

(21) Appl. No.: 11/959,731

(22) Filed: Dec. 19, 2007

(65) Prior Publication Data

US 2008/0142260 A1    Jun. 19, 2008

(30) Foreign Application Priority Data

Dec. 19, 2006    (JP) ............................. 2006-340800

(51) Int. Cl.
*H02G 3/04* (2006.01)

(52) U.S. Cl. ................. 174/72 A; 174/68.1; 174/70 C; 174/72 R; 174/97; 439/429; 248/49

(58) Field of Classification Search ............... 174/72 A, 174/68.1, 68.3, 70 C, 97–99 R, 135, 72 R, 174/71 R; 439/34, 360, 429; 248/49, 157
See application file for complete search history.

(56) References Cited

U.S. PATENT DOCUMENTS 5,160,811 A * 11/1992 Ritzmann .................. 174/68.3

FOREIGN PATENT DOCUMENTS

| JP | 8-332906 A | 12/1996 |
|---|---|---|
| JP | 10-112922 A | 4/1998 |
| JP | 2001-150994 A | 6/2001 |
| JP | 2004-112984 A | 4/2004 |
| JP | 2005-59745 A | 3/2005 |

* cited by examiner

*Primary Examiner*—Dhiru R Patel
(74) *Attorney, Agent, or Firm*—Sughrue Mion, PLLC

(57) ABSTRACT

A power feeding apparatus includes: a wire harness which includes a first portion, a second portion, and a bended portion connected to the first portion and the second portion, the bended portion has a substantially U-shape; a first protector which supports the first portion; and a second protector which supports the second portion. The second protector includes a guide portion having an opening. The guide portion receives the second portion so as to lead-out the second portion from the opening.

8 Claims, 7 Drawing Sheets

POWER FEEDING APPARATUS AND HARNESS WIRING STRUCTURE USING THE SAME

BACKGROUND

The present invention relates to a power feeding apparatus capable of feeding electricity to a sliding seat of an automobile at all times by curving a wire harness into a substantially U-shape even when the sliding seat is moved. The present invention also relates to a harness wiring structure in which the power feeding apparatus is used.

FIG. 7 is a view showing a form of a conventional power feeding apparatus and also showing a form of a harness wiring structure in which the conventional power feeding apparatus is used. Concerning this matter, for example, refer to Patent Document 1.

This power feeding apparatus 51 is applied to a sliding seat 52, which is incorporated into an automobile, and arranged on a floor 53 of the automobile body. The power feeding apparatus 51 includes: a case 54 made of metal or synthetic resin; a slider 55 slidably engaged with a guide rail (not shown) of the case 54 so that the slider 55 can slide in the longitudinal direction (in the backward and forward direction of the automobile); and a wire harness 57 arranged in the case being formed into a substantially J-shape or U-shape, wherein one end side of the wire harness is fixed to the slider 55 and connected to a circuit on the seat side by a connector 56 and the other end side is introduced out from the case 54 to the floor side.

The slider 55 includes: a vertical portion 55a protruding upward from the case 54; and a horizontal portion 55b engaged with a guide rail provided in the case. On an upper end side of the vertical portion 55a, a connector 56 is arranged. The connector 56 includes: terminals (not shown) connected to end portions of a plurality of insulated covered wires composing the wire harness 57; and a connector housing (substituted shown by reference numeral 56) made of insulating resin for covering the terminals. The wire harness 57 is completely covered with the case 54 all over the length. The case 54 is longitudinally arranged in a recess portion 58 formed on the floor 53.

As shown by the solid line in FIG. 7, at a forward end position of the slide of the seat 52 the slider 55 is located on a forward end side of a narrow width portion 54a in the first half of the case 54 and the wire harness 57 is curved into a substantially J-shape in the case. As shown by the chain line in the drawing, at a rear end position of the slide of the seat 52, the slider 55 is moved to a rear end side of a wide width portion 54b in the second half of the case 54 and the wire harness 57 is curved into a substantially reverse-J-shape in the case.

[Patent Document 1] JP-A-2005-59745 (FIG. 7)

However, in the conventional power feeding apparatus described above and the harness wiring structure in which the conventional power feeding apparatus is used, the wire harness 57 is completely covered with the large case 54. Therefore, the following problems may be encountered. The structure becomes large-sized and further the weight becomes heavy. Furthermore, the manufacturing cost is raised. Accordingly, as shown in FIG. 7, it is necessary to provide a deep recess portion 58 on the floor 53. In the case where it is impossible to ensure a predetermined depth of the recess portion 58, the case 54 must be protruded onto the floor 53. Therefore, unless a gap (space) L formed on the lower side of the seat 52 is high, it is impossible to apply the conventional power feeding apparatus. Further, since a height of the position of the slider 55 can not be changed, it is impossible to apply the conventional power feeding apparatus to a vehicle, the height of the seat 22 of which is adjustable.

SUMMARY

The present invention has been accomplished in the light of the above points. An object of the present invention is to provide a power feeding apparatus characterized in that: the above problems, which are caused when the case is used, are solved; the structure is made compact so that the weight can be reduced and the manufacturing cost can be decreased; and it is possible to apply the power feeding apparatus to a vehicle, the seat height of which is low, and it is also possible to apply the power feeding apparatus to a vehicle, the seat height of which is adjustable. Another object of the present invention is to provide a harness wiring structure in which the power feeding apparatus is used.

In order to accomplish the above objects, the present invention provides a power feeding apparatus including:

a wire harness which includes a first portion, a second portion, and a bended portion connected to the first portion and the second portion, the bended portion has a substantially U-shape;

a first protector which supports the first portion; and a second protector which supports the second portion, wherein the second protector includes a guide portion having an opening; and wherein the guide portion receives the second portion so as to lead-out the second portion from the opening.

According to the above structure, the first protector on the stationary side is fixed to the stationary structural body such as a vehicle body. The second protector on the movable side is fixed to the movable structural body such as a sliding seat. The wire harness is wired from the stationary structural body to the movable structural body. In accordance with a movement of the movable structural body in the positive direction, one portion (a second portion) of the wire harness is accommodated in the guide portion of the second protector. In accordance with a movement of the movable structural body in the reverse direction, the other portion of the wire harness is introduced out from the harness guide portion being curved, so that the thus introduced out portion (the second portion) can become a portion of one portion (the first portion or the bended portion) of the wire harness. The harness guide portion accommodates and protects the other portion of the wire harness and smoothly introduces out the wire harness from the long opening. Between both protectors, the wire harness can be exposed being freely curved. In this case, the wire harness may be covered with a flexible protective tube. Therefore, the wire harness can be moved in the three-dimensional directions, that is, the wire harness can be moved in the longitudinal direction, the vertical direction and the lateral direction. Of course, one portion and the other portion of the wire harness are portions of the wire harness located on both sides with respect to the bended portion. An assembled body, in which a plurality of electric wires and a protective tube are assembled to each other, may be referred to as a wire harness.

Preferably, the first protector includes a support portion which supports the first portion.

Due to the above structure, one portion (the first portion) of the wire harness is stably supported along the harness support portion of the stationary side protector and an introducing direction of one portion is prescribed. In the same manner as that of the harness guide portion, the harness support portion may be a portion having a long opening for introducing out the wire harness from an accommodation state while the wire harness is being curved. The harness support portion may be extended so that the harness support portion can get over a step formed on the floor.

Preferably, the wire harness is covered with a protective tube and the protective tube is fixed to the first protector and the second protector.

Preferably, the first protector is arranged so as to be substantially parallel to the second protector.

Due to the above structure, when the protective tube comes into contact with each protector, the wire harness (a plurality of electric wires) in the protective tube can be safely protected from abrasion caused by the contact with the protector. Of course, the electric wires are safely protected from interference with the outside being covered with the protective tube. Concerning the protective tube, it is preferable to use a bellows-shaped corrugated tube because it is easy to attach the bellows-shaped corrugated tube to each protector. From the viewpoint of enhancing the flexibility, it is preferable that the protective tube has a flat cross-section.

In order to accomplish the above another objects, the present invention provides a harness wiring structure using the power feeding apparatus, wherein the first protector is fixed to a fixing structural body;

wherein the second protector is fixed to a movable structural body; and wherein the wire harness is wired from the fixing structural body to the movable structural body.

Preferably, when the movable structural body moves in a direction away from the stationary structural body, the wire harness is led-out from the opening of the guide portion.

Due to the above structure, it is possible to provide the same action effect as that of the above-described invention. Accordingly, electricity can be positively fed from the stationary structural body to the movable structural body at all times in a small space.

According to the invention, without using the conventional case, the wire harness is partially covered with two protectors. Therefore, the structure can be made compact, the weight can be made light and the manufacturing cost can be reduced. Further, the structure of the present invention can be applied to a vehicle, the seat height of which is small. Furthermore, between both protectors, the wire harness can be freely curved and moved in the three-dimensional directions. Therefore, the structure of the present invention can be applied to a vehicle, the seat height of which can be adjusted, and it becomes possible to adjust an attaching position in the protector width direction of one of the protectors. Further, one portion of the wire harness introduced out from the stationary side protector can be freely wired in accordance with a shape of the floor and the like.

According to the invention, a direction of introducing out one portion of the wire harness is prescribed along the harness support portion. Therefore, at the time of moving the movable side protector, the wire harness can be smoothly and positively introduced into the harness guide portion.

According to the invention, the wire harness (electric wires) provided in the protective tube can be safely protected from the interference with each protector. Therefore, the reliability of feeding electricity at all times can be enhanced.

Furthermore, according to the invention, electricity can be positively fed from the stationary structural body to the movable structural body at all times in a space, the height of which is suppressed. Further, it is possible to cope with a movement of the movable structural body in the three-dimensional directions. Further, in accordance with a shape of the stationary structural body side, the wire harness can be smoothly curved and electricity can be positively fed at all times.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION

Figure 1:
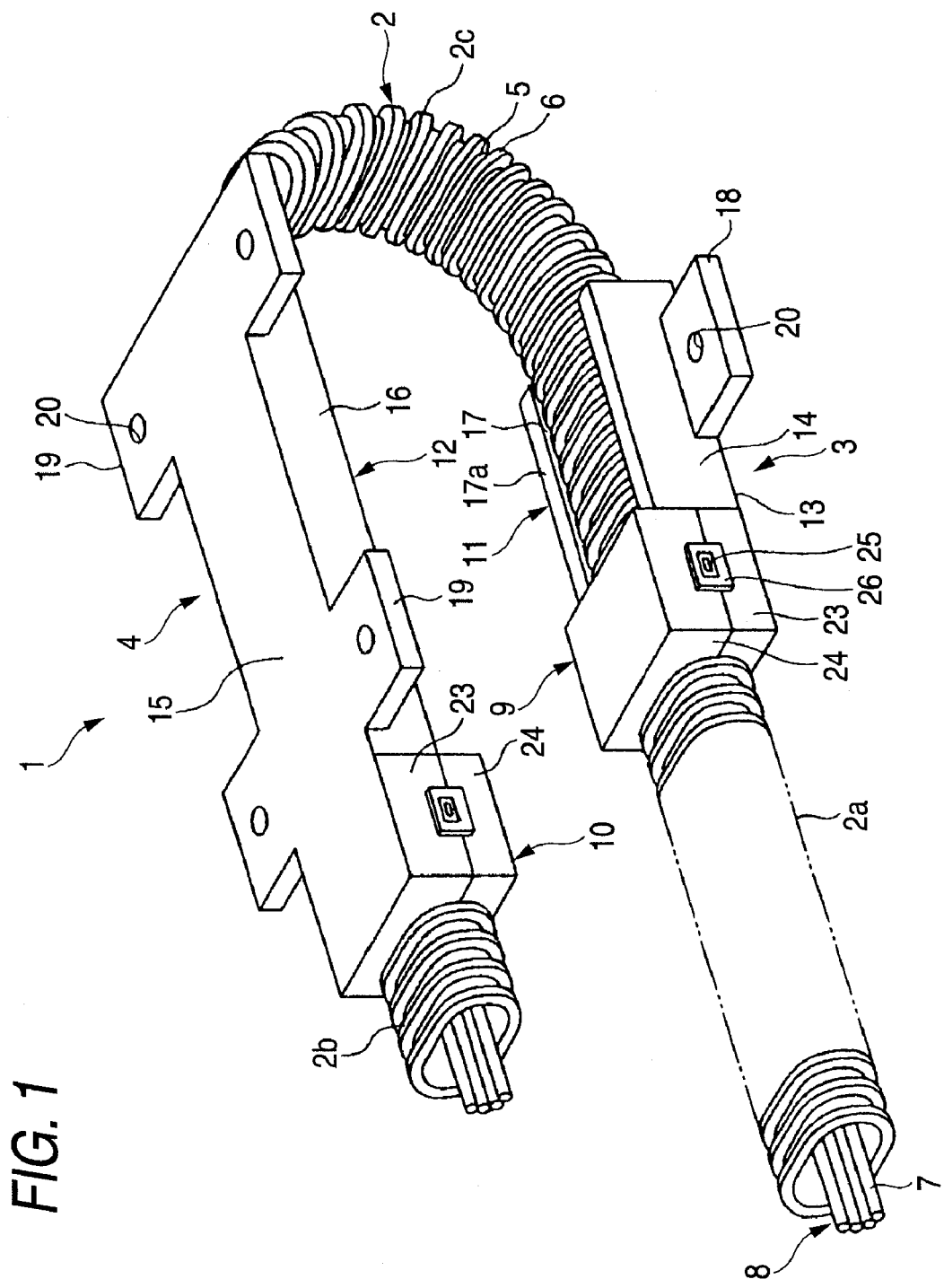
FIG. 1 is a perspective view showing an embodiment of a power feeding apparatus of the present invention and a harness wiring structure in which the power feeding apparatus is used.
Figure 2A:
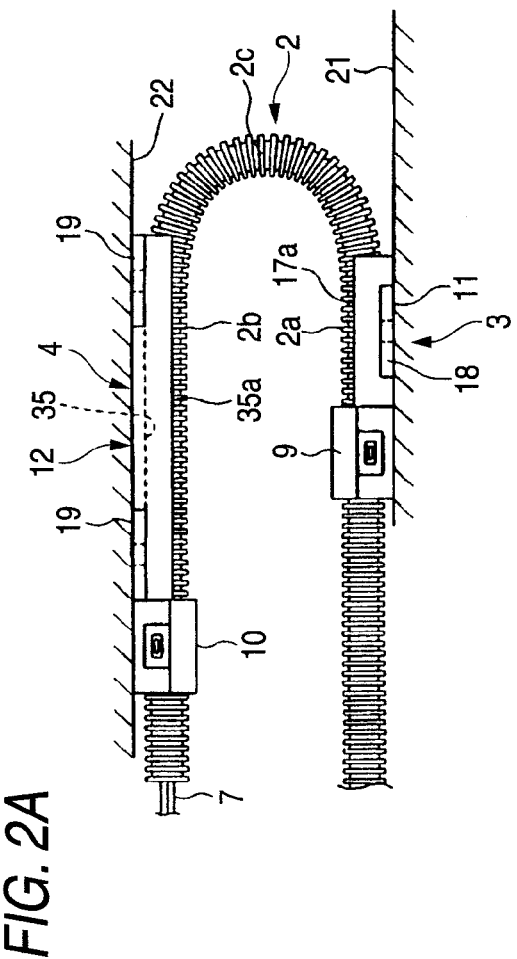
FIGS. 2A and 2B are side views respectively showing a form of the movement in the longitudinal direction of the power feeding apparatus and the harness wiring structure in which the power feeding apparatus is used.
Figure 2B:
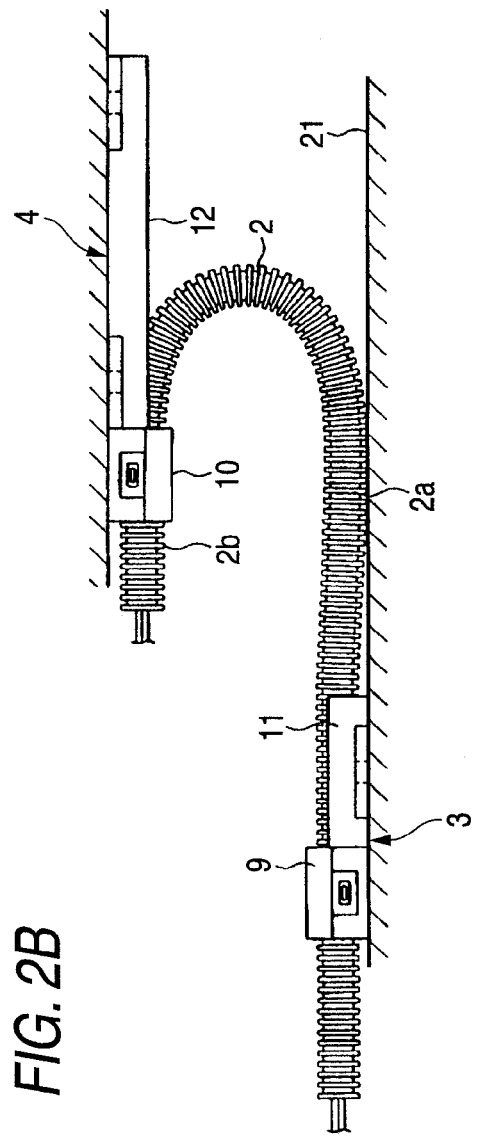
Figure 3:
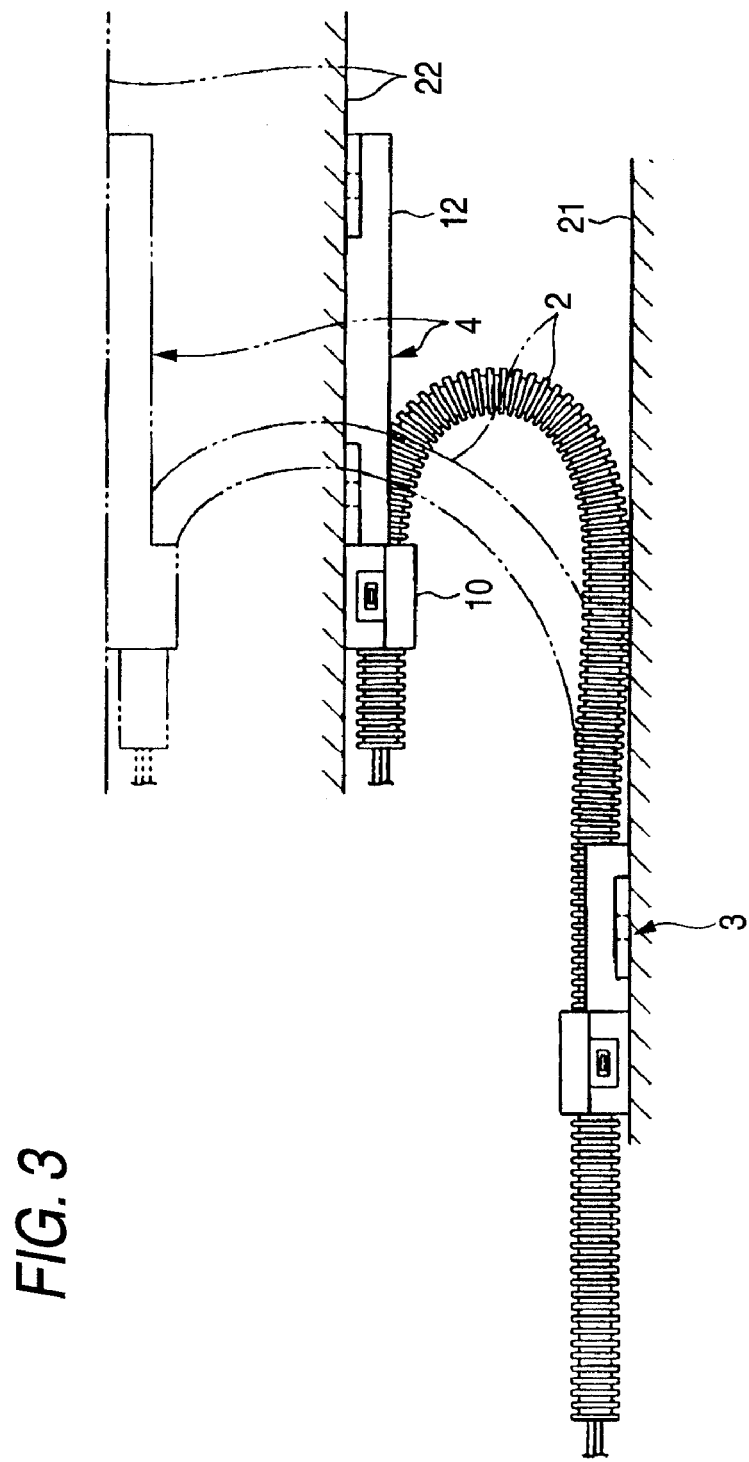
FIG. 3 is a side view showing a form of the movement in the up and down direction of the power feeding apparatus and the harness wiring structure in which the power feeding apparatus is used.

FIGS. 1 to 3 are views showing an embodiment of a power feeding apparatus and a harness wiring structure, in which the power feeding apparatus is used, of the present invention.

The power feeding apparatus 1 includes: a corrugated tube 2, the cross-section of which is flat (elliptical), which is a protective tube made of synthetic resin; a stationary side protector 3 made of synthetic resin fixed to a lower side corrugated tube portion 2a under the condition that the corrugated tube 2 is curved into a substantial U-shape or J-shape above and below; and a movable side protector 4 made of synthetic resin fixed to an upper side corrugated tube portion 2b.

The corrugated tube 2 is of the existing type in which recess grooves 5 and protrusions 6 formed in the circumferential direction are alternately arranged in the longitudinal direction so that the corrugated tube 2 can be given flexibility. The corrugated tube 2 is formed thin in the curved direction. A length of the corrugated tube 2 is appropriately set in accordance with the necessity. Into the corrugated tube, a plurality of insulated covered wires 7 are inserted. A plurality of wires 7 compose a wire harness 8. In some cases, a plurality of wires 7 and a corrugated tube 2 are referred to as a wire harness.

Each of the upper and the lower protector 3, 4 has a tube fixing portion (harness fixing portion) 9, 10, the shape of which is substantially rectangular cylindrical. Each tube fixing portion 9, 10 has ribs (protrusions) not shown engaged with recess grooves 5 formed in the corrugated tube 2 and these ribs are provided on an inner circumferential face of the tube fixing portion 9, 10. The upper and the lower protector 3, 4 are arranged in parallel with each other.

The lower side protector 3 has a tube support portion (harness support portion) 11 which is formed integrally with the lower side protector 3 at the rear of the tube fixing portion 9. The upper side protector 4 has a tube guide portion (harness guide portion) 12, which guides the corrugated tube 2, which is formed integrally with the upper side protector 4 at the rear of the tube fixing portion 10. The tube support portion 11 and the tube guide portion 12 are straightly extended from the tube fixing portions 9, 10. In the present embodiment, the tube guide portion 12 is formed two or three times longer than the tube support portion 11.

Cross-sectional shapes of the tube support portion 11 and the tube guide portion 12 are substantially the same with each other. That is, the tube support portion 11 is formed out of a horizontal bottom wall 13 and both vertical side walls 14 into a shape, and the cross-section of the tube support portion 11 is formed being recessed. The tube guide portion 12 is formed out of a horizontal ceiling wall 15 and both vertical side walls 16 into a channel shape, the cross-section of the tube guide portion 12 is formed being recessed.

In the present embodiment, heights of both side walls 14, 16 are set to be smaller than an outer diameter (thickness) on the short diameter side of the corrugated tube 2. Into the recess portion 17, the cross-section of which is rectangular, surrounded by both side walls 14 and the bottom wall 13 (right, left and lower side) of the tube support portion 11, a lower side portion 2a of the corrugated tube 2 enters from the upper side opening 17a and engages. Into the recess portion 35 (shown in FIG. 2), the cross-section of which is rectangular, surrounded by both side walls 16 and the ceiling wall 15 (right, left and upper side) of the tube guide portion 12, an upper side portion 2b of the corrugated tube 2 enters and engages from the lower side opening portion 35a.

A size of the inside width of each recess portion 17, 35 is set to be somewhat larger than the outer diameter on the long diameter side of the corrugated tube 2. It is preferable that chamfering (not shown) is made inside of the forward end portions of both side walls 13, 16 so that the corrugated tube 2 can be smoothly entered.

As shown in FIG. 2A, when the upper side protector 4 is moved forward together with the corrugated tube 2 and both protectors 3, 4 are opposed to each other in the vertical direction, the corrugated tube 2 enters the tube guide portion 12 all over the length. As shown in FIG. 2B, when the upper side protector 4 is moved backward together with the corrugated tube 2, the corrugated tube 2 leaves downward from the tube guide portion 12 and becomes a portion of the lower side corrugated tube portion 2a.

As shown in FIG. 2A, the corrugated tube 2 enters the tube support portion 11 of the lower side protector 3 all over the length. These circumstances are the same as those shown in FIG. 2B. In this connection, in FIG. 2A, in the case where the upper side protector 4 is further advanced, the corrugated tube 2 leaves upward from the tube support portion 11 of the lower side protector 3 and becomes a portion of the upper side corrugated tube portion 2b.

In the present embodiment, on the lower side protector 3, a pair of right and left brackets 18 (shown in FIG. 1) are provided. On the upper side protector 4, two pairs of right and left brackets 19 (shown in FIG. 1) are provided. Each bracket 18, 19 has a hole portion 20 into which a bolt or an engaging clip is inserted. The bracket 18 of the lower side protector 3 is fixed to, for example, the floor 21 side (shown in FIG. 2) of a vehicle body. The bracket 19 of the upper side protector 4 is fixed to, for example, the seat 22 side.

The tube fixing portion 9, 10 of each protector 3, 4 includes: a base portion 23 (shown in FIG. 1) continuing to the tube support portion 11 and the tube guide portion 12; and a cover portion 24 (shown in FIG. 1) which is arranged on the base portion 23 being capable of freely opening and closing through a hinge (not shown). When each cover portion 24 is closed, it is fixed to the base portion 23 by an engaging means such as an engaging protrusion 25 and an engaging frame piece 26. It is preferable that ribs (not shown) for fixing the tube are protruded from both inner circumferential faces of the base portion 23 and the cover portion 24. When the ribs of each tube fixing portion 9, 10 enter and engage with the recess grooves 5 of the corrugated tube 2, the corrugated tube 2 is fixed to each protector 3, 4.

As shown in FIG. 3, the upper side protector 4 can be freely moved upward and downward together with the corrugated tube 2, for example, in accordance with an adjustment of the height of the seat 22. The upper side protector 4 is moved upward integrally with the seat 22 as shown by the chain line when the seat 22 is raised, and the corrugated tube 2 is curved into a curved shape of a large diameter between the upper side protector 4 and the lower side protector 3. The corrugated tube 2 is released from the tube guide portion 12 of the upper side protector 4 and curved downward from the rear end portion side of the tube fixing portion 10.

In the case where a rising distance of the seat 22 is short, the corrugated tube 2 is curved downward from an intermediate portion in the longitudinal direction of the tube guide portion 12. These circumstances are the same in the case where the upper side protector 4 is advanced in FIG. 2A. FIG. 3 shows a moving state in which the upper side protector 4 shown in FIG. 2B moves upward and downward.

Figure 4A:
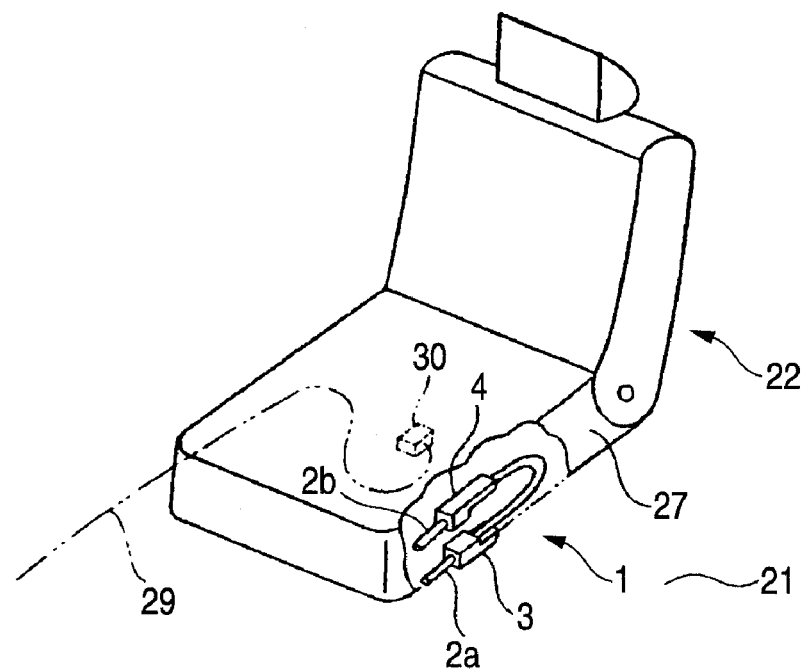
FIG. 4A is a partially cut-out perspective view showing an example in which a power feeding apparatus is applied to a sliding type seat of an automobile and FIG. 4B is a side view in which a partially cross-section of a portion of the power feeding apparatus is shown.
Figure 4B:
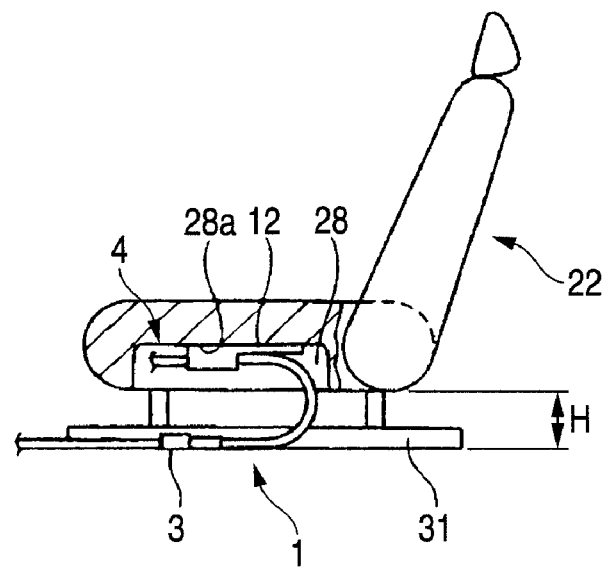

FIGS. 4A and 4B are views showing an embodiment in which the above power feeding apparatus 1 is applied to a sliding type seat 22 of an automobile.

The power feeding apparatus 1 is arranged on one side of the seating portion 27 of the seat 22. The lower side protector 3 is fixed to the floor 21 of the vehicle body. The upper side protector 4 is fixed to the upper wall 28a in the inside space 28 of the seat 22. Height H of the seat 22 from the floor 21 is set to be low. When this power feeding apparatus 1 is used, it is possible to cope with the power seat 22 arranged at a low position.

The electric wire 7 (shown in FIG. 1) introduced out from the lower side corrugated portion 2a, which is laid along the lower side protector 3, is connected to a wire harness (not shown) on the floor side by means of a connector. The electric wire 7 (shown in FIG. 1) introduced out from the upper side corrugated tube portion 2b, which is laid along the upper side protector 4, is connected to a seat side wire harness by means of a connector. It is possible to integrate each electric wire 7 with the floor side wire harness. Alternatively, it is possible to directly connect each electric wire 7 to an auxiliary machine, which is provided on the seat side, by means of a connector.

The electric wire (wire harness) 29 shown by the chain line in FIG. 4A is an example of the form of the conventional floor side wire harness which is shown for reference. The electric wire is connected to the seat side wire harness or an auxiliary machine through the connector 30 provided on the forward end side. The electric wire 29 is arranged along the floor 21 and further arranged in the seating portion 27 on the lower side of the seat 22 while enough length of the electric wire 29 is being provided.

In FIG. 4B, the seat 22 retracts a little along the guide rail 31 on the floor side, that is, the seat 22 is located at a movement position in the middle between FIGS. 2A and 2B. When the seat 22 is advanced along the guide rail 31 in the state shown in FIG. 4B, as shown in FIG. 2A, while the upper side corrugated tube portion 2b is entering the tube guide portion 12 of the upper side protector 4, a portion of the lower side corrugated tube portion 2a moves upward and becomes an upper side corrugated tube portion 2b through the arcuate curved portion 2c.

When the seat 22 retracts, the corrugated tube 2 is curved and moved by a reverse action to that described above. At the time of adjusting a height of the seat 22, as shown in FIG. 3, the upper side protector 4 elevates together with the corrugated tube 2. In any case, the electric wire 7 in the corrugated tube integrally moves together with the corrugated tube 2.

Figure 5A:
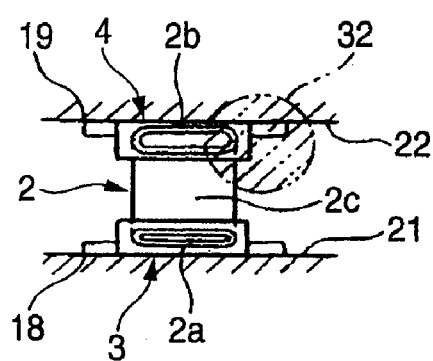
FIGS. 5A and 5B are front views showing embodiments in which an upper side protector of the power feeding apparatus is moved to the side in order to prevent interference with an object.
Figure 5B:
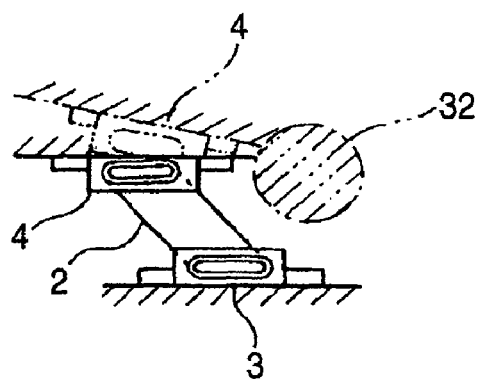

FIGS. 5A and 5B are views showing an example of the wire harness wiring structure in which the upper side protector 4 is moved in the lateral direction (to the right and left).

FIG. 5A is a view showing an example in which the upper and lower protectors 3, 4 are arranged being opposed to each other in the vertical direction in the same manner as that shown in FIG. 1. In the case where some interference object 32 on the seat side, which is arranged on the side of the protector 4, interferes with the upper side protector 4, as shown in FIG. 5B, the upper side protector 4 can be moved in a reverse direction to that of the upper side protector 4 and fixed to the seat 22.

The above structure is composed in such a manner that the entire wire harness (the plurality of electric wires and the entire corrugated tube) is not covered with the protector but covered with only the upper and lower protectors 3, 4 and the corrugated tube 2 is flexibly exposed between both protectors 3, 4. The corrugated tube 2 is exposed being flexible not only in the vertical direction but also in the twisting direction (in the inclination direction). Therefore, as shown by the chain line in FIG. 5B, the upper side protector 4 can be fixed to the seat 22 being inclined.

In the case where the interference object 32 is located on the floor side 21, it is possible to cope with the circumstances when the lower side protector 3 is moved in the lateral direction. The lower side protector 3 can be fixed to the floor 21 under the condition that the lower side protector 3 is inclined. Both protectors 3, 4 can be arranged being inclined.

Figure 6A:
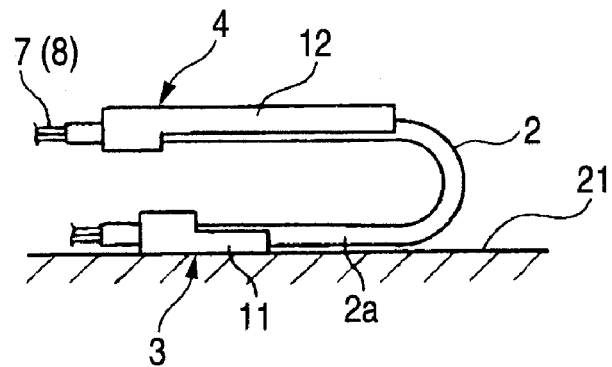
FIGS. 6A to 6C are side views respectively showing each example in which a form of wiring the wire harness is changed according to a shape of the floor.
Figure 6B:
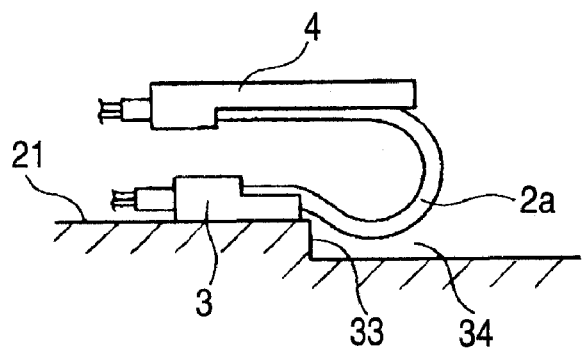
Figure 6C:
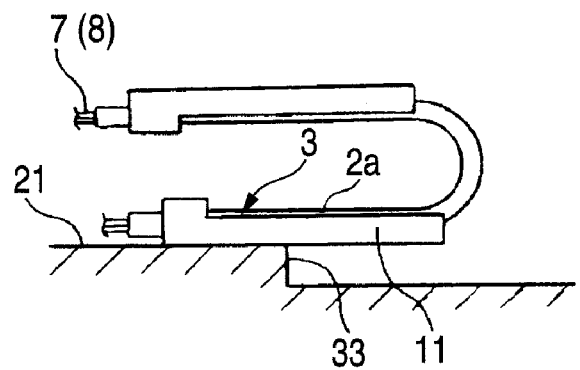
Figure 7:
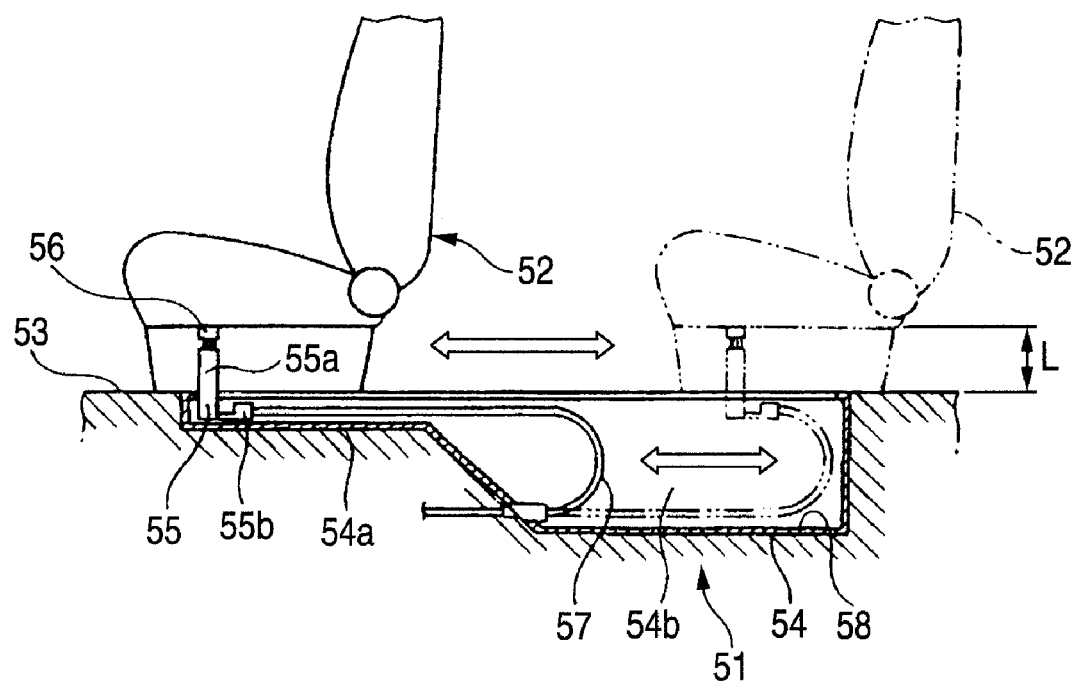
FIG. 7 is a partially sectional side view showing a form of the conventional power feeding apparatus and the harness wiring structure in which the power feeding apparatus is used.

FIGS. 6A to 6C are views showing examples of the harness wiring structure which copes with a shape of a recess portion formed on the floor 21 side of a vehicle body. In the drawings, reference numeral 4 is an upper side protector, reference numeral 3 is a lower side protector and reference numeral 2 is a corrugated tube.

FIG. 6A is a view showing an example in which the lower side corrugated tube portion 2a is horizontally wired on the floor 21 in the same manner as that shown in FIG. 1. In the case where the step 33 is provided on the floor 21 as shown in FIG. 6B, the lower side corrugated tube portion 2a is set into the recess portion 34 of the step portion 33 and the wire harness 8 can be wired along a shape of the floor 21.

As shown in FIG. 6C, the tube support portion 11 of the lower side protector 3 is horizontally extended on the same face as that of the floor 21 on the upper side of the step 33 and the lower side corrugated tube portion 2a is horizontally supported together with the wire harness 8 without being curved.

In this connection, in the embodiments described above, explanations are made into a case in which the present invention is applied to a sliding type seat 22 of an automobile. However, instead of the sliding type seat 22 of an automobile, it is possible to apply the above power feeding apparatus and the harness wiring structure, in which the power feeding apparatus is used, to a sliding type seat of any vehicles or any apparatuses. It is also possible to apply the above power feeding apparatus and the harness wiring structure, in which the power feeding apparatus is used, to a sliding type door incorporated into a device as well as the seat.

In the above embodiment, the protectors 3, 4 are arranged upward and downward and the corrugated tube 2 is curved in the vertical direction. However, for example, in the case where it is impossible to obtain a space in the longitudinal direction on the seat side, the following structure can be adopted. The power feeding apparatus 1 shown in FIG. 1 is inverted by 90° in the lateral direction. (In this case, FIG. 2 becomes a plan view.) Then, the protectors 3, 4 are arranged on the right and left and the corrugated tube 2 is curved to the right and left.

In the above embodiment, the flat corrugated tube 2 to cover a plurality of electric wires 7 is used. However, instead of the flat corrugated tube 2, other corrugated tubes (not shown) such as a corrugated tube, the cross-section of which is circular, and a soft net-shaped tube can be adopted. Further, it is possible to adopt such a structure that a plurality of electric wires 7 are exposed without using the protective tube 2 and the plurality of electric wires 7 are bundled with a band or a tape. In this case, the plurality of electric wires 7 are held, for example, by the cover 24 of the harness fixing portion 9, 10 of each protector 3, 4. Alternatively, the plurality of electric wires 7 are fixed by winding a tape round the electric wires 7 or fastening the electric wires 7 with a band, in the harness fixing portion 9, 10. Alternatively, the cover 24 of the harness fixing portion 8, 10 is abolished and the plurality of electric wires are fixed to the base portion 23 with a tape or a band.

In the above embodiment, the harness support portion 11 is provided on the lower side protector 3. However, for example, the harness support portion 11 can be abolished and the lower side protector 3 can be composed of only the harness fixing portion 9. In this case, the bracket 18 is provided on the harness fixing portion 9.

In the above embodiment, heights of the tube support portion 11 of each protector 3, 4 and the tube guide portion 12 are set smaller than the short diameter of the corrugated tube 2. However, it is possible to set these heights to be the same as the short diameter of the corrugated tube 2 or to be larger than that so as to enhance the protection property of accommodation.

What is claimed is:

1. A power feeding apparatus, comprising:
   a wire harness which includes a first portion, a second portion, and a curved portion connected to the first portion and the second portion, the curved portion having a substantially U-shape;
   a first protector including a first fixing portion for fixing the first portion of the wire harness; and
   a second protector including a second fixing portion for fixing the second portion of the wire harness,
   wherein the second protector further includes a guide portion disposed adjacent the second fixing portion for receiving and supporting the wire harness, said guide portion including a channel having a longitudinally extending opening therein through which said wire harness passes as a relative position of the first portion and the second portion changes.

2. The power feeding apparatus according to claim 1, wherein the first protector includes a support portion which supports the first portion.

3. The power feeding apparatus according to claim 2, wherein said support portion includes a channel having a longitudinally extending opening therein in which said wire harness is received and supported.

4. The power feeding apparatus according to claim 1, wherein the wire harness is covered with a protective tube; and wherein the protective tube is fixed to the first protector and the second protector.

5. The power feeding apparatus according to claim 1, wherein the first protector is arranged so as to be substantially parallel to the second protector.

6. A harness wiring structure using the power feeding apparatus according to claim 1, wherein the first protector is fixed to a stationary structural body;

wherein the second protector is fixed to a movable structural body; and wherein the wire harness is wired from the stationary structural body to the movable structural body.

7. The harness wiring structure according to claim 6, wherein when the movable structural body moves in a direction away from the stationary structural body, the wire harness is led-out from the opening of the guide portion.

8. The power feeding apparatus according to claim 1, wherein the opening of the guide portion is open toward the first protector.

* * * * *